United States Patent
Laurent et al.

(10) Patent No.: US 6,257,604 B1
(45) Date of Patent: Jul. 10, 2001

(54) ASSEMBLY CONTAINING A WHEEL AND A SUSPENSION INTEGRATED WITH THE WHEEL

(75) Inventors: Daniel Laurent, Marly; Daniel Walser, Fribourg, both of (CH)

(73) Assignee: Conception et Developpement Michelin S.A., Givizier (CH)

( * ) Notice: Subject to any disclaimer, the term of this patent is extended or adjusted under 35 U.S.C. 154(b) by 0 days.

(21) Appl. No.: 09/439,509

(22) Filed: Nov. 12, 1999

(30) Foreign Application Priority Data

Nov. 13, 1998 (FR) .................................................. 98 14443

(51) Int. Cl.⁷ .................................................. B60G 3/99
(52) U.S. Cl. ...................................... 280/124.127; 267/68
(58) Field of Search ........................ 280/124.127; 267/68

(56) References Cited

U.S. PATENT DOCUMENTS

| | | | |
|---|---|---|---|
| 1,984,694 | * 12/1934 | Nottoli | 267/68 |
| 2,105,171 | 1/1938 | Tjaarda | 267/19 |
| 2,175,516 | 10/1939 | Bugatti | 267/59 |
| 2,238,410 | * 4/1941 | Capuciati | 280/124.127 |
| 2,939,344 | 6/1960 | Harris . | |
| 3,666,178 | 5/1972 | Crimmins et al. | 239/77 |

FOREIGN PATENT DOCUMENTS

| | | |
|---|---|---|
| 0469475 | 2/1992 | (EP) . |
| 0878332 | 11/1998 | (EP) . |
| 15215 | 5/1912 | (FR) . |
| 569702 | 4/1924 | (FR) . |

* cited by examiner

*Primary Examiner*—Kenneth R. Rice
(74) *Attorney, Agent, or Firm*—Baker Botts L.L.P.

(57) ABSTRACT

A suspension assembly of a motor vehicle which assemble includes a wheel carrier and a guide member to guide the wheel carrier in relative translation. The wheel carrier is mounted on the guide member by means of a bar sliding in the guide member guided by rollers turning on roller ways arranged on the bar. The assembly includes a spiral spring acting between the bar of the wheel carrier and a guide member of an electromechanical machine that is operated to control the suspension deflection movements.

11 Claims, 3 Drawing Sheets

ASSEMBLY CONTAINING A WHEEL AND A SUSPENSION INTEGRATED WITH THE WHEEL

BACKGROUND OF INVENTION

The present invention concerns the suspension of vehicles and, more specifically, the guidance of a vehicle wheel in relation to the chassis of that vehicle, as well as control of deflection of the wheel in relation to the chassis.

It is known that a wheel is mounted on a hub, and that the hub is mounted on a wheel carrier by means of a bearing defining the axis of rotation of the wheel. Guidance of the wheel consists of making possible a displacement of the wheel carrier in relation to the vehicle to an extent sufficient for the suspension of the vehicle. At the same time, guidance of the wheel should be such that control of the path of the vehicle is ensured with the utmost care. The deflection movement sought is very wide vertically. It may be desired to permit a slight movement longitudinally, while ideally it is sought to prevent any relative transverse movement. Furthermore, the steering and camber variations that might induce all these movements have to be strictly contained, which also puts a constraint on design that the expert has to take into account.

If the plane perpendicular to the axis of rotation of the wheel is called wheel "plane," passing through the middle of the wheel, or more precisely through the center of the area of contact with the road of a pneumatic tire or non-pneumatic tire mounted on said wheel (generally referred to below as "tire"), control of the deflection movement actually means that guidance has to ensure a strictly controlled position of the wheel plane relative to the chassis.

In addition to the guidance aspect of the wheel plane, the suspension also has to ensure weight transfer of the vehicle on the wheel and control of the amplitude of movements allowed by guidance. That is the role ordinarily played by the springs and shock absorbers or parts combining the functions of spring (flexibility) and shock absorption (preventing the maintenance of oscillations).

All of the suspensions used at the present time on vehicles have the common characteristic of being rather cumbersome. The suspension arms must have a certain length for their angular movement and not be accompanied, for example, by overly great tracking variations (suspension diagrams). Even the MacPherson strut, the growing use of which is known to be due to the greater space it leaves for installing a motor power unit in transverse position, introduces some problems, including its height dimension.

Furthermore, the search for an ever better compromise between suspension comfort and handling leads to proposing so-called active or semiactive suspensions, control of which is now rendered possible by the progress of electronics. In general, that leads to making installation of the suspension on the vehicle even more cumbersome, by increasing the space occupied by springs and/or shock absorbers, not to mention adding extra elements forming the spring or shock absorber.

SUMMARY OF THE INVENTION

The object of the invention is to propose a complete suspension assembly, easy to integrate with a vehicle, while permitting a suspension whose elasticity and shock absorption characteristics are well controlled.

The invention proposes a suspension assembly of a motor vehicle, said assembly containing a hub designed to support a wheel, said wheel containing a disk and a tire and defining a wheel plane through the center of the area of contact with the road of a tire mounted on the wheel, said wheel containing:

- a support comprising mounting means for making possible mounting of the support on the chassis of a vehicle, said support being intended to be locked on vertical deflection relative to the chassis;
- a guide member locked on vertical deflection relative to the support;
- a single elongated bar, guided in relative translation by the guide member and sliding inside said guide member, mounted in rotation on the sliding axle locked in relation to the guide member;
- a wheel carrier mounted on the bar at both ends of the latter, said wheel carrier defining the axis of rotation of said hub, means for supporting the weight of the vehicle transmitted by the support to the wheel carrier, said means for supporting the weight comprising a spring acting between two points of application of the stress of the spring, one integral with the wheel carrier and the other integral with the guide member.

The invention thus proposes an assembly making it possible, in a preferred embodiment, to integrate the guidance necessary for wheel deflection and the elements making it possible to ensure the necessary flexibility and control of deflection inside the wheel. In that way, it is possible for the essential functions of the suspension (guidance of the wheel plane, degree of freedom in the desired direction and control of deflection movements) to be integrated in the actual interior space of the wheel. It is thus possible very simply to mount that assembly to the chassis of the vehicle in any suitable manner and, notably, rigidly. In the latter case, the guide member plays a support role for suspension and is integrated with the chassis, which makes very simple use possible. The support being intended to be locked in vertical deflection relative to the chassis and the guide member being mounted locked in vertical deflection relative to the support, the guide member is therefore locked in vertical deflection relative to the chassis.

Preferably, in order to radically reduce the space occupied, the invention aims at installing as many parts useful to the suspension as possible in the space available inside the wheel, that is to say, on one side of the wheel disk and radially inside the wheel.

The electronic automatic control means available at the present time make it possible to run an electric motor more rapidly and more directly than a hydraulic or pneumatic component. That is why, in a particularly advantageous variant, the invention proposes using a linear or rotary electric motor for controlling the deflection movements of the wheel. An arrangement is thus proposed which makes it possible to house such a motor in the assembly according to the invention, while remaining roughly within the interior space limits of the wheel. The invention thus has the advantage of lending itself particularly well to active control of the suspension characteristics and, more specifically, to direct electric control of the suspension characteristics.

Let us note that, when translation guidance of the bar is "friction-free," that is, involving as little friction as possible, control of the deflection movement is thereby facilitated, for it is not distorted by parasite frictions, the extent of which is often variable. Roller guidance is very appropriate. Rollers cooperating with roller ways provided on the bar can be used, the rollers being mounted rotating on the guide member. Relative sliding contact surfaces could thus be imagined, insofar as they involve appropriate treatment or insofar as they are sufficiently lubricated. For example, a fluid bearing can be used. That variant lends itself particularly well to control of deflection essentially by means of an electromechanical machine that can be run for that purpose, for the absence of boundary friction simplifies its operation and improves overall performances.

The invention is applicable to steering wheels as well as to driving wheels and to steering and driving wheels at the same time. It makes it possible to install a pivot and to install the steering angle control point. It makes it possible, in the case of steering wheels, to place the pivot axis of the wheel in the wheel plane defined above and on a diameter, that is, so as to be able to adopt the so-called "pivot-in-axis" solution, that is to say, an arrangement in which the axis about which the wheel can steer is perpendicular to the axis of rotation of the wheel, the assembly being so arranged in order that said axis about which the wheel steers is secant to the tire foot print substantially in the middle of the foot print. Hence in a very advantageous design variant, the bar axis and the pivot axis of the hub carrier are offset, the pivot axis being defined by pivoting points arranged laterally in relation to the axis of the bar, that is to say offset with respect to the bar axis, so that the axis of pivoting and the axis of rotation are secant. This makes it possible, while freeing enough space in the center to pass a mechanical transmission to adopt a so-called "pivot-in-axis" arrangement. The hub contains, centered on the axis of rotation of the wheel, means of linkage to a mechanical transmission shaft capable of applying a torque to the hub by direct engagement on the center of the wheel. Due to the deflection of the wheel with respect to the chassis of the vehicle to which the assembly is fastened, it is desirable to locate a transmission shaft joint, preferably a homokinetic one, right at the intersection point between the pivot axis and the rotation axis of the wheel.

As the element forming a spring, a spiral spring is used. The inner turn of the latter is integral with the guide member (which is the basis for the reference linked to the chassis) and the outer turn of said spiral spring is integral with a belt connected to the wheel carrier (which exactly follows the wheel deflections).

DESCRIPTION OF THE DRAWINGS

The invention will be better understood from the description which follows of a nonlimitative example, referring to the attached drawing in which.

DESCRIPTION OF PREFERRED EMBODIMENTS

Figure 1:
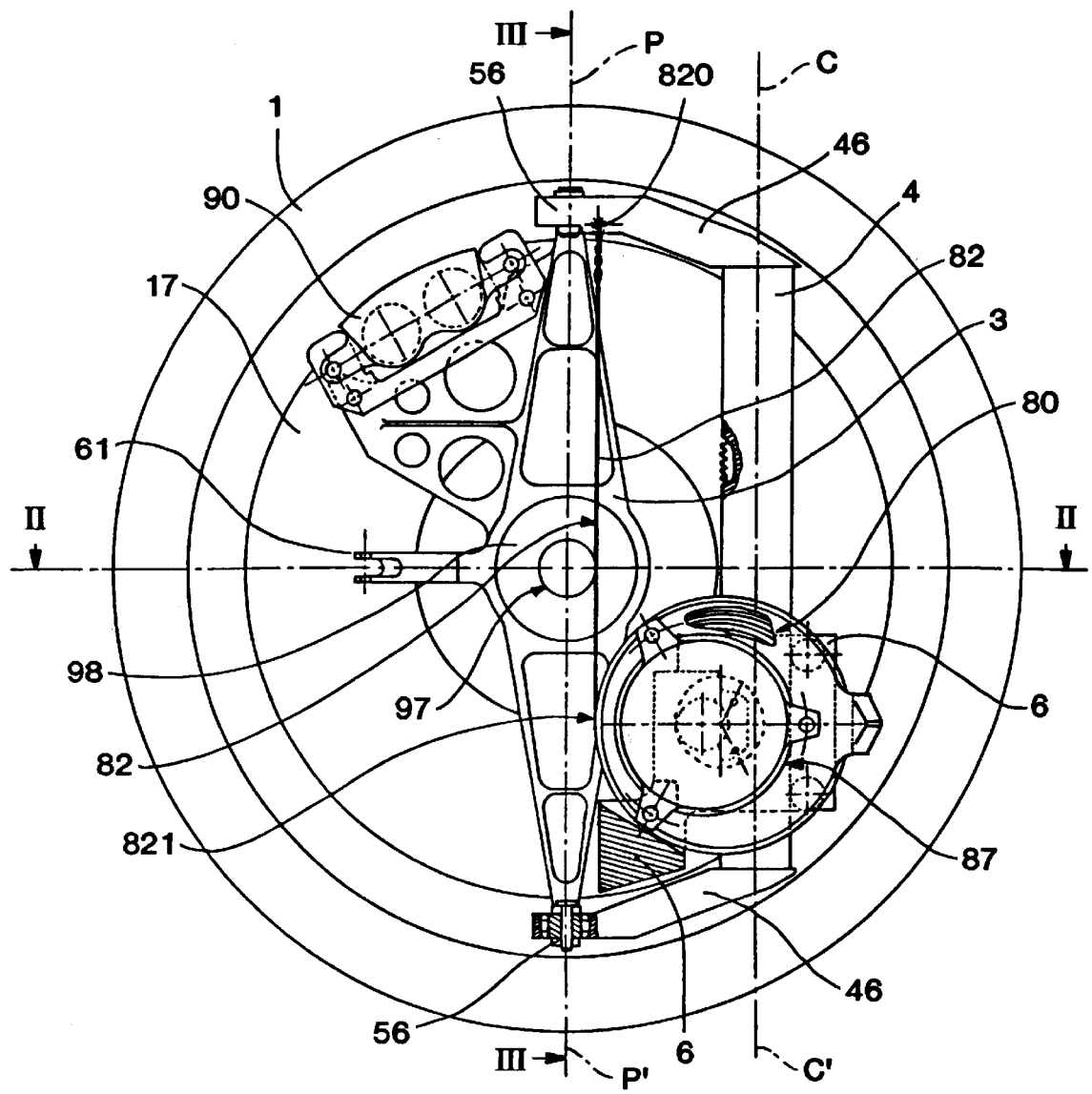
FIG. 1 is a partial view along I—I of FIG. 2, with some partial sections.

In the different figures a tire 1 can be seen, mounted on a rim 10, the latter being made in two parts 11 and 12, axially separable, following one of the possible methods of mounting a tire 1 on a rim. Other solutions could, of course, be adopted, such as a tire permanently mounted on its rim, or a noninflated or nonpneumatic tire, the invention not concerning the means ensuring contact with the road.

The rim 10 is connected to a wheel disk 13. The rim 10 and the disk 13 form a wheel 14. Said wheel 14 is mounted on a hub 15 by two studs (not represented). A brake disk 17 is integral with the hub 15. The working details of mounting of a wheel and a brake disk on a hub are well known and do not require fuller explanation. The subassembly just described constitutes the rotating parts of the assembly according to the invention. Their axis of rotation is axis XX'. These rotating parts are mounted on a wheel carrier 3 by means of a bearing 2.

Figure 2:
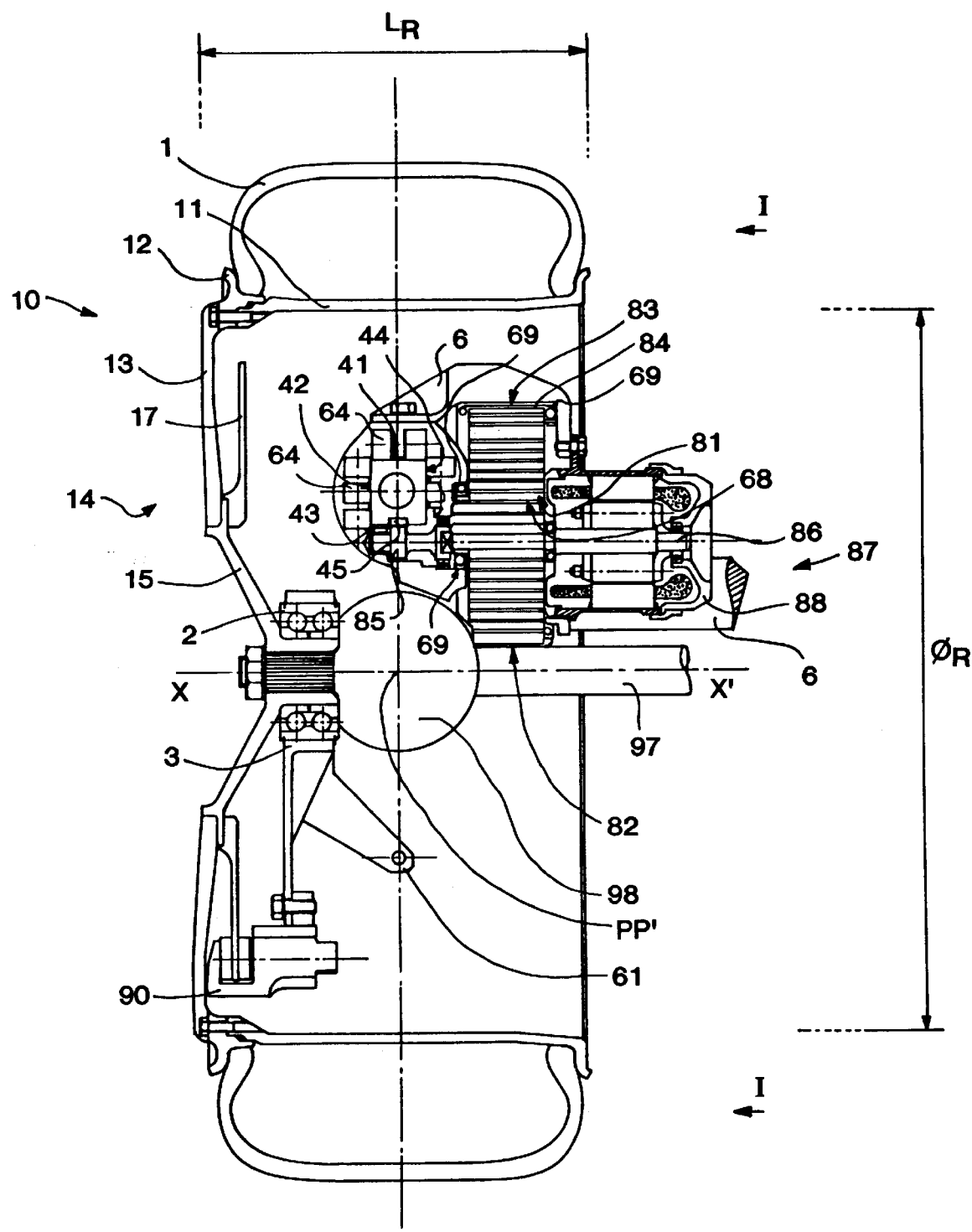
FIG. 2 is a partial view and partial section along II—II of FIG. 1.
Figure 3:
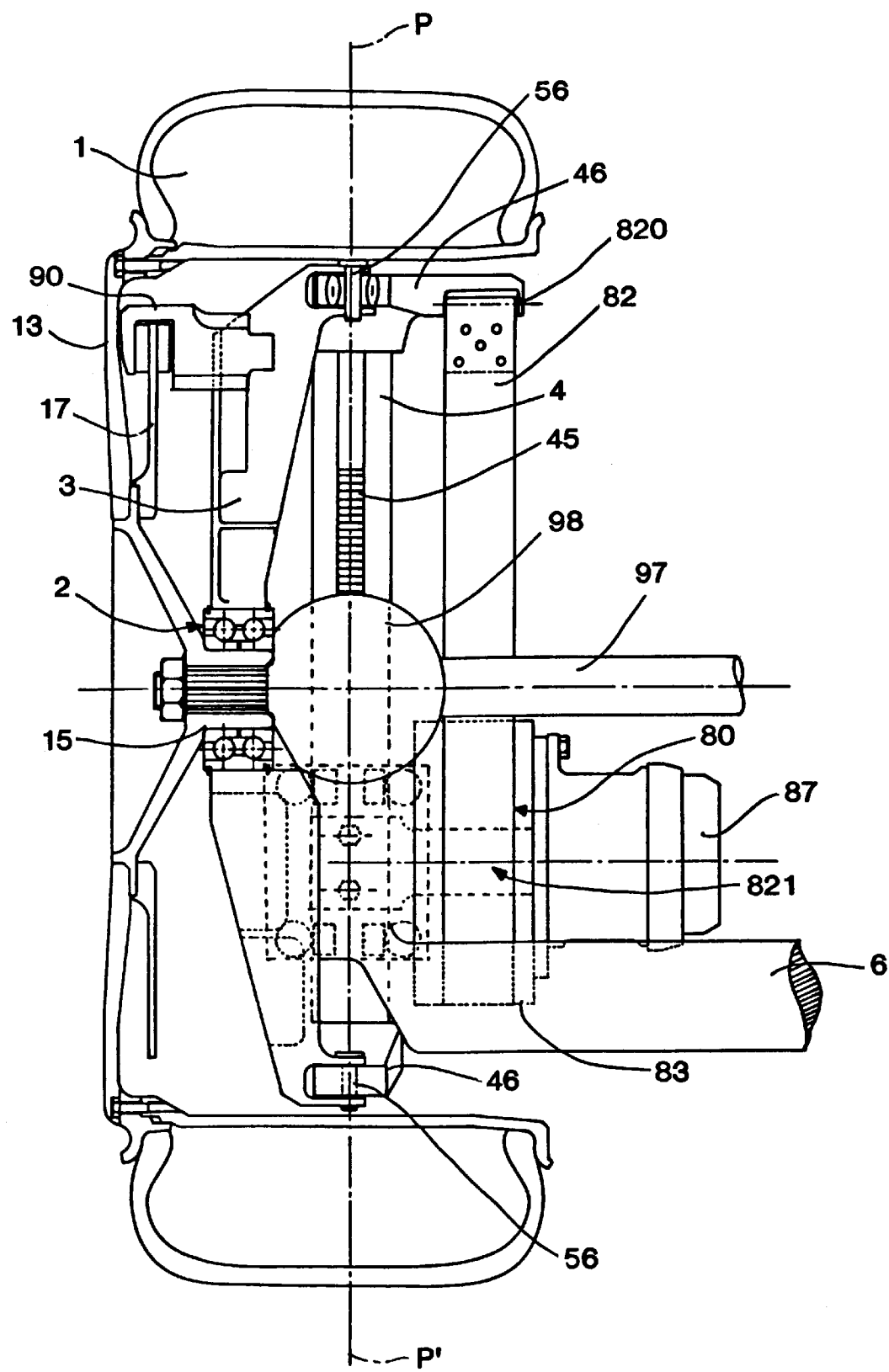
FIG. 3 is a section along III—III of FIG. 1.

The wheel carrier 3 is in turn rendered integral with a bar 4 by brackets 46. The bar 4 illustrating the invention has a longitudinal axis CC'. Furthermore, it is chosen here in square section. This type of section, among others possible, makes it possible to lock the bar 4 against rotation on its axis CC'. The bar 4 thus contains four roller ways 41, 42, 43, 44 (FIG. 2). The wheel carrier 3 and the bar 4 are arranged and mounted relative to each other so that the axis CC' of the bar 4 is perpendicular, but not secant to axis XX' of rotation of the wheel 14. The bar 4 and the wheel carrier 3 form part of what are usually called nonsuspended members and are nonrotating.

The bar 4 bears on a roller assembly 64, cooperating with the roller ways 41, 42, 43, 44. Those rollers are mounted rotating on a guide member 6 in order to allow translation of the bar 4 along its axis CC'. The guide member 6 surrounds the bar 4 and the wheel carrier 3 is mounted on the bar at both ends of the latter. The bar, the wheel carrier 3 and the guide member 6 are housed in a casing delimited radially by a reference diameter $\Phi_R$, and axially on one side by the wheel disk. In particular, the bar, the wheel carrier 3 and the guide member 6 are housed in a casing delimited axially on one side by the wheel disk and, from a boundary fixed by the disk of said wheel, by a width corresponding roughly to a reference width $L_R$ corresponding to the space required in width of the wheel and its tire, whatever the embodiments of the latter.

The bar 4 and the guide member 6 form a slide. The bar 4 cannot turn on axis CC' independent of the guide member 6. The wheel carrier 3 is mounted pivoting on the bar 4 by means of pivots 56 placed at the ends of the brackets 46. There is then a degree of freedom of pivoting of the wheel carrier 3 relative to the guide member 6. Although the longitudinal axis of the bar is offset from the center of the wheel, the axis of pivoting (about which the wheel steers) is centered in the wheel.

Thus, one and only one degree of freedom exists between the guide member 6 and the wheel carrier 3: a relative translation along axis CC'. That translation is sufficient both upward and downward. It therefore makes possible a suspension stroke sufficient for expansion as well as for compression.

Let us further note that a lever arm 61 (FIG. 1) is integral with the wheel carrier 3. Said lever 61 can be connected to a drive rod (not shown), designed and/or installed preferably to prevent or to limit to an acceptable value the steering of the wheel induced by wheel deflection (compliance steer). In the case of a non-steering wheel, the bar 4 could be rigidly mounted on the brackets 46, or the degree of freedom of rotation on axis CC' can be locked by adequate mounting of a steering tie rod on the lever 61.

It has been seen that the suspension movement proposed in this invention is ensured by the relative translation possible between the bar 4 and the guide member 6. It has also been seen how the steering of the wheel 14 is rendered possible. It was stated that the guide member 6 can be rigidly mounted on the chassis of a vehicle, which does not rule out the use of rubber vibration-preventing parts.

It will now be described how means of controlling the movements of rotation and deflection of the wheel can be integrated with the suspension assembly.

Let us begin with the suspension movement (wheel deflection). In accordance with a particular feature of the embodiment, the spring responsible for the load support acts between two points of application offset with respect to the bar axis, whereby the resulting stress which the spring develops to support the load of the vehicle is oriented parallel to the bar axis and acts on a point offset with respect to the bar axis. In the example illustrating the invention, the means of control of deflection of the bar relative to the guide member are implemented as indicated below. A spiral spring 80 acts between the wheel and the chassis to support the weight of the vehicle.

In the example illustrating the invention, the spiral spring is obtained by cutting along a spiral line into a solid steel washer having the desired width for the spiral spring, with a radially outer cylindrical surface and a radially inner cylindrical surface. The spiral cutting does not join either the inner cylindrical surface or the outer cylindrical surface. One thus obtains in a single piece the spiral spring itself and two cylindrical sleeves, one inner and the other outer, in order to connect the spiral spring to the elements between which it must act.

The inner sleeve extending the inner turn 81 of the spiral spring 80 is mounted on a quill 68 which extends the guide member 6. The inner turn is thus integral with the guide member 6, which renders it integral with the chassis of the vehicle as far as control of the suspension deflection movement is concerned. The outer sleeve extending the outer turn 84 of the spiral spring 80 is integral with a rotating cylindrical casing 83, centered relative to the quill 68 thanks to the bearings 69. The axis of the bearing is perpendicular to the bar axis. A belt 82 is attached on said cylindrical casing 83. It is thus functionally linked to the outer turn 84, to which it imparts a regular rotation, that is, without being able to offset the outer turn 84 in relation to the inner turn 81. Furthermore, the belt 82 is attached to one of the brackets 46 and, therefore, to the bar 4. The belt 82 is thus integral with the wheel carrier 3 as far as control of the suspension deflection movement is concerned. The belt 82 is wound around the cylindrical casing containing the spiral spring 80. Thus, the belt 82 transfers the vertical movements of the wheel to the outer turn 84 of the spiral spring 80, while converting the linear motion of deflection of the wheel into rotary motion in order to apply a moment to the spiral spring 80.

The bearing points of stress of the spring 80 which, as stated, are offset relative to the axis of the bar 4 are, on one side, the mounting point 820 of the belt 82 on the upper bracket 46 and the tangent point 821 of the belt 82 on the rotating casing 83.

As far as the spring is concerned, it can also be seen that this part is housed in a casing delimited radially by the reference diameter $\Phi_R$ and axially on one side by the wheel disk. In particular, the spring is housed inside a casing determined, on one side, by a boundary fixed by the wheel of said disk and, on the other side, by a virtual plane tangent to the wheel, according to the same remarks as made above.

Let us now see how the maintenance of oscillations of the spring 80 can be prevented. The bar 4 has a rack 45. A pinion 85 is engaged on said rack. The pinion 85 transmits its rotary motion to the rotor 86 of an electromechanical machine 87 whose stator 88 is integral with the guide member 6. The shaft of the rotor 86 of the rotating electromechanical machine 87 passes into the inner turn of the said spiral spring, as can well be seen in FIG. 2. The electromechanical machine 87 and the spiral spring 80 are placed side by side, thus rendering the installation of all these suspension functions very compact.

The linear motion of the bar 4 is thus converted into rotary motion, acted upon by means of the electromechanical machine 87, in order to introduce the necessary shock absorption function, or any other more elaborate function aimed at imparting an active character to the suspension by means of an adequate control of said electromechanical machine 87. The design of such an elaborate function does not by itself form part of this invention, the object of which is to provide the mechanical and electromechanical means rendering this possible. Let us simply add, to be thorough, that a simple means of securing shock absorption is to connect the electromechanical machine to a resistive load and to slow down the rotary motion of its rotor according to the same principle as the well known electric retarders equipping certain highway vehicles like passenger buses.

After the spring and shock absorber functions or equivalent functions, let us examine the installation of the braking means. Let us recall that a brake disk 17 is integral with the hub 15. The brake force is applied on the brake disk 17 by a brake caliper 90 integral with the wheel carrier 3. The brake caliper 90 is offset from the axis CC' of the bar 4, which enables it to be housed in the space available inside the wheel 14. The brake caliper 90 makes it possible on demand to grip the brake disk 17 by an appropriate control, hydraulic or electric, for example, said control not by itself forming part of this invention. Of course, this type of brake, a disk brake, is only a structural variant and, more generally speaking, the invention can use braking means containing a revolving part provided with at least one braking track, said revolving part belonging to said assembly and being integral with the hub, said assembly containing a braking element for applying a friction material on said track, said braking element being integral with the wheel carrier, and said braking element and said spring being mounted on both sides of the bar.

The invention is illustrated in its application to a driving wheel. A transmission shaft 97 transmits a torque to the hub 15 via a homokinetic joint 98 placed in the pivot axis. Let us note that a cylindrical casing 83 containing the spring 80 and the electromechanical machine 87 do not follow either the steering movements of the wheel or the suspension deflection movements. As for the transmission shaft 97, it is immobile in the space upon steering, because the homokinetic joint 98 is exactly centered on the pivot axis, but sweeps the space during suspension deflection. Due to the proposed arrangement for the spring, the space occupied by the spiral spring 80 and the electromechanical machine 87 is particularly compact and does not interfere with transmission passage.

The invention also extends to the case where the assembly contains a toothed wheel integral with the hub, said toothed wheel being engaged with a pinion mounted turning on the wheel carrier, the movement of said pinion being controlled by a traction motor whose stator is integral with the wheel carrier, the rotor of which brings said pinion into direct engagement, so as to be able to apply a torque to said hub via the toothed wheel. In fact, it is also possible to add a concentric toothed wheel to the hub 15, just beside the brake disk 17, which easily makes it possible to add one or more electric motors that thus act in parallel with the mechanical transmission through the shaft 97. This arrangement can be useful for a parallel hybrid vehicle.

What is claimed is:

1. A suspension assembly of a motor vehicle, said assembly having a hub designed to support a wheel, said wheel comprising:

a support including mounting means for mounting of the support on a chassis of a vehicle, said support being intended to be locked on vertical deflection relative to the chassis, a guide member locked on vertical deflection relative to the support, a single elongated bar having an axis and being guided in relative translation by the guide member and sliding inside said guide member, said bar being mounted in rotation locked in relation to the guide member, a wheel carrier mounted on the bar at both ends of the latter, said wheel carrier defining the axis of rotation of said hub, said bar being arranged with respect to said wheel carrier so that the bar is offset with respect to said axis of rotation of the hub, means for supporting the weight of the vehicle transmitted by the support to the wheel carrier, said means for supporting the weight comprising a spring acting between two points of application of the stress of the spring, one integral with the wheel carrier and the other integral with the guide member, linkage means to a mechanical transmission shaft, centered on the axis of rotation of the hub, said linkage means applying a torque to the hub.

2. An assembly according to claim 1, in which the spring is a spiral spring.

3. An assembly according to claim 1, containing an axis of pivoting, in which the axis of the bar and the axis of pivoting of the hub carrier are offset, the axis of pivoting being defined by pivoting points arranged laterally relative to the axis of the bar, so that the axis of pivoting and the axis of rotation are secants.

4. An assembly according to claim 2, in which the inner turn of the spiral spring is integral with the guide member and in which the outer turn of the spiral spring is integral with a rotating cylindrical casing containing said spiral spring and including a belt attached to and wound around said casing.

5. An assembly according to claim 3, in which said spring acts between two points of application offset with respect to the bar axis, whereby the resulting stress which develops to support the load of the vehicle is oriented parallel to the axis bar and acts on a point offset with respect to the bar axis.

6. An assembly according to claim 1, in which the guidance in translation of the bar by the guide member is essentially friction-free guidance, said assembly comprising means of control of deflection including a rack arranged on the bar, engaged with a pinion mounted for rotation on the guide member, and a rotatable electromechanical machine for controlling the rotation of the pinion.

7. An assembly according to claim 6, in which a shaft of the rotatable electromechanical machine extends into an inner turn of said spiral spring, said machine and the spiral spring being placed side by side.

8. An assembly according to claim 1, including rollers which cooperate with roller ways arranged on the bar, said rollers being mounted for rotation on the guide member in order to guide translation of the bar without bearing friction.

9. An assembly according to claim 1, in which the wheel carrier, the bar and the guide member are housed in a casing limited radially by said tire and delimited axially on one side by a boundary fixed by the disk of said wheel.

10. An assembly according to claim 9, in which the spring is housed in said casing and is axially housed inside a virtual plane tangent to the end of the wheel.

11. An assembly according to claim 1, in which said hub is designed to support braking means, the braking means including a revolving part provided with at least one braking track, said revolving part belonging to said assembly and being integral with the hub, said assembly including a braking element for applying a friction material on said track, and said braking element being integral with the wheel carrier.

* * * * *